United States Patent
Li et al.

(10) Patent No.: US 9,563,419 B2
(45) Date of Patent: Feb. 7, 2017

(54) MANAGING DEPLOYMENT OF APPLICATION PATTERN BASED APPLICATIONS ON RUNTIME PLATFORMS

(71) Applicant: International Business Machines Corporation, Armonk, NY (US)

(72) Inventors: Shao C. Li, Beijing (CN); Jie Cui, Beijing (CN); Arjun Natarajan, Old Tappan, NJ (US); Florian Pinel, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 14/184,869

(22) Filed: Feb. 20, 2014

(65) Prior Publication Data

US 2015/0234651 A1  Aug. 20, 2015

(51) Int. Cl.
*G06F 9/45* (2006.01)
*G06F 9/455* (2006.01)
(Continued)

(52) U.S. Cl.
CPC . *G06F 8/67* (2013.01); *G06F 8/10* (2013.01); *G06F 8/36* (2013.01); *G06F 8/38* (2013.01);
(Continued)

(58) Field of Classification Search
CPC ............... G06F 8/34; G06F 8/30; G06F 8/36; G06F 8/72; G06F 11/1469; G06F 9/5072; G06F 9/4856; G06F 9/546; G06F 21/12; G06F 8/38; G06F 8/61; G06F 8/10; G06F 8/20; G06F 8/75; G06F 11/368; G06F 9/455

See application file for complete search history.

(56) References Cited

U.S. PATENT DOCUMENTS 6,263,352 B1  7/2001  Cohen
7,366,706 B2  4/2008  Chang et al.
(Continued)

FOREIGN PATENT DOCUMENTS

EP  1855241 A1  11/2007
WO  0125860 A1  4/2001
(Continued)

OTHER PUBLICATIONS

Hongbin Lu et al., Pattern-based Deployment Service for Next Generation Clouds, 2013 IEEE, [Retrieved on Jul. 1, 2016]. Retrieved from the internet: <URL: http://ieeexplore.ieee.org/stamp/stamp.jsp?tp=&arnumber=6655736> 8 Pages. (464-471).*

(Continued)

*Primary Examiner* — Thuy Dao
*Assistant Examiner* — Anibal Rivera
(74) *Attorney, Agent, or Firm* — Yee & Associates, P.C.; Louis J. Percello

(57) ABSTRACT

A method for managing application patterns. Service application programming interfaces required for use by an application on a runtime platform are provisioned. The application is based on an application pattern. Deployment information for deploying the application on the runtime platform is generated. The deployment information includes values for properties of the application pattern for configuring the application on the runtime platform. The deployment information is used to deploy the application on the runtime platform. In response, the runtime platform runs the application with the application using the service application programming interfaces previously provisioned for use by the application on the runtime platform.

20 Claims, 9 Drawing Sheets

(51) Int. Cl.
*G06F 9/44* (2006.01)
*G06F 9/445* (2006.01)
*G06F 11/36* (2006.01)
*H04L 29/08* (2006.01)
*G06F 9/48* (2006.01)

(52) U.S. Cl.
CPC . *G06F 8/60* (2013.01); *G06F 8/75* (2013.01); *G06F 11/368* (2013.01); *H04L 67/1002* (2013.01); *G06F 9/4856* (2013.01)

(56) References Cited

U.S. PATENT DOCUMENTS

| | | | |
|---|---|---|---|
| 8,055,935 B2 | 11/2011 | Chafle et al. | |
| 8,161,456 B2 | 4/2012 | Bojjireddy et al. | |
| 8,307,339 B2* | 11/2012 | Sundararajan | G06F 8/36 717/120 |
| 8,312,425 B2 | 11/2012 | Hepper et al. | |
| 8,312,426 B2 | 11/2012 | Bouillet et al. | |
| 2005/0268232 A1* | 12/2005 | Stienhans | G06F 8/38 715/700 |
| 2006/0206864 A1* | 9/2006 | Shenfield | G06F 8/20 717/107 |
| 2006/0206890 A1* | 9/2006 | Shenfield | G06F 8/20 717/174 |
| 2006/0236254 A1* | 10/2006 | Mateescu | G06F 8/75 715/762 |
| 2007/0061354 A1* | 3/2007 | Sarkar | G06Q 10/06 |
| 2007/0156418 A1 | 7/2007 | Richter et al. | |
| 2009/0276771 A1* | 11/2009 | Nickolov | G06F 9/4856 717/177 |
| 2012/0185821 A1* | 7/2012 | Yaseen | G06F 8/10 717/105 |
| 2012/0324069 A1* | 12/2012 | Nori | H04L 41/0806 709/222 |
| 2012/0331519 A1* | 12/2012 | Yu | G06F 21/12 726/1 |
| 2013/0152047 A1* | 6/2013 | Moorthi | G06F 11/368 717/124 |
| 2013/0262923 A1* | 10/2013 | Benson | H04L 67/1097 714/15 |
| 2013/0275958 A1* | 10/2013 | Ivanov | G06F 8/61 717/174 |
| 2013/0326487 A1* | 12/2013 | Yousouf | G06F 9/455 717/134 |
| 2014/0181517 A1* | 6/2014 | Alaranta | H04L 63/062 713/168 |
| 2014/0208096 A1* | 7/2014 | Brandwine | G06F 21/602 713/156 |
| 2014/0208111 A1* | 7/2014 | Brandwine | H04L 63/0428 713/171 |
| 2015/0019722 A1* | 1/2015 | Narayanan | H04L 43/0876 709/224 |
| 2015/0039770 A1* | 2/2015 | Manglik | G06F 9/5072 709/226 |

FOREIGN PATENT DOCUMENTS

| | | |
|---|---|---|
| WO | 2007035545 A2 | 3/2007 |
| WO | 2008015417 A1 | 2/2008 |

OTHER PUBLICATIONS

Martin Keen et al., Patterns: Implementing an SOA Using an Enterprise Service Bus, Jul. 2004, [Retrieved on Jul. 1, 2016]. Retrieved from the internet: <URL: http://ck20.com/MQ/WBIMB/sg246346%20Implementing%20SOA%20using%20ESB.pdf> 386 pp. (1-364).*

Mell et al., "The NIST Definition of Cloud Computing," dated Oct. 7, 2009, 2 pages. Accessed Jan. 27, 2014, http://www.nist.gov/itl/cloud/upload/cloud-def-v15.pdf.

Sirin et al., "Template-based Composition of Semantic Web Services," Proceedings of the 1st International AAAI Fall Symposium on Agents and the Semantic Web, Nov. 2005, 8 pages.

* cited by examiner

```
"patternId" : 66,
"name" : "instance001",
"description" : "An instance of pattern 66",
"configurationValues" : [ {
        "propertyId" : 402,
        "value" : "With product price"
} ],
"endpointBinding": [ {
        "serviceDependencyId" : 701,
        "description" : "",
        "serviceApiId" : 3001,
        "endpointId" : 7001,
        "authenticationMethodBinding" : {
                "methodId" : 3301,
                "credentialValues" : [
                        {
                                "authenticationPropertyId" : 3011,
                                "value" : "NNDJ08JSX23dJhs"
                        }
                ]
        }
} ]
```

MANAGING DEPLOYMENT OF APPLICATION PATTERN BASED APPLICATIONS ON RUNTIME PLATFORMS

BACKGROUND OF THE INVENTION

1. Field of the Invention

The disclosure relates generally to an improved data processing system, and, in particular, to a data processing system for managing data processing systems. Still more particularly, the present disclosure relates to a method and apparatus for managing deployment of an application pattern based application on a runtime platform.

2. Description of the Related Art

Application patterns are used to construct applications. These application patterns, for example, may specify steps performed by the applications. The steps performed by the applications include steps that use application programming interfaces. The application programming interfaces specified for use by the applications may be provided as a service by any number of different providers.

Some application programming interfaces require authorized access before an application can use the application programming interfaces. For example, some services require an administrator perform steps to configure the application for using the services.

These applications may be deployed onto runtime platforms for running on the runtime platforms. Deployment of an application on a runtime platform may include installing and configuring the application for running the application on the runtime platform. The application programming interfaces used by the running application may be local or remote to the runtime platform where the application is running. One type of runtime platform is a cloud computing based runtime platform.

Cloud computing involves the delivery of computing resources of a data processing environment. Through the use of services hosted in the data processing environment, cloud computing provides applications access to the computing resources of the data processing environment. Computing resources of a cloud computing provider may include hardware resources, software, information, and other services. Computing resources of a cloud computing provider may be located in a single location or widely distributed. The data processing environments of a cloud computing provider are typically located at server computers in a location that is remote to the users. The computing resources in the data processing environments of a cloud computing provider may be provided by the user, by the cloud computing provider, and by third-party providers of computing resources. The users of a particular data processing environment of a cloud computing provider may be consumers and corporate users. In some situations the users of a data processing environment may also be corporate users from two or more corporations who are sharing use of resources.

Any changes associated with services in use by an application on a runtime platform, may require an administrator perform additional steps to re-configure the application. For example, a service may move location, become unavailable, or require new or different authorization.

Therefore, it would be desirable to have a method, apparatus, and computer program product that takes into account at least some of the issues discussed above.

SUMMARY

In one illustrative embodiment, a method, apparatus, and computer program product for managing application patterns is disclosed. An apparatus provisions service application programming interfaces required for use by an application on a runtime platform. The application is based on an application pattern. The apparatus also generates deployment information for deploying the application on the runtime platform. The deployment information includes values for properties of the application pattern for configuring the application on the runtime platform. The apparatus further uses the deployment information to deploy the application on the runtime platform. In response the runtime platform runs the application with the application using the service application programming interfaces previously provisioned for use by the application on the runtime platform.

BRIEF DESCRIPTION OF THE DRAWINGS

FIG. 8 is an example of deployment information for an application in accordance with an illustrative embodiment.

DETAILED DESCRIPTION OF THE PREFERRED EMBODIMENT

Figure 1:
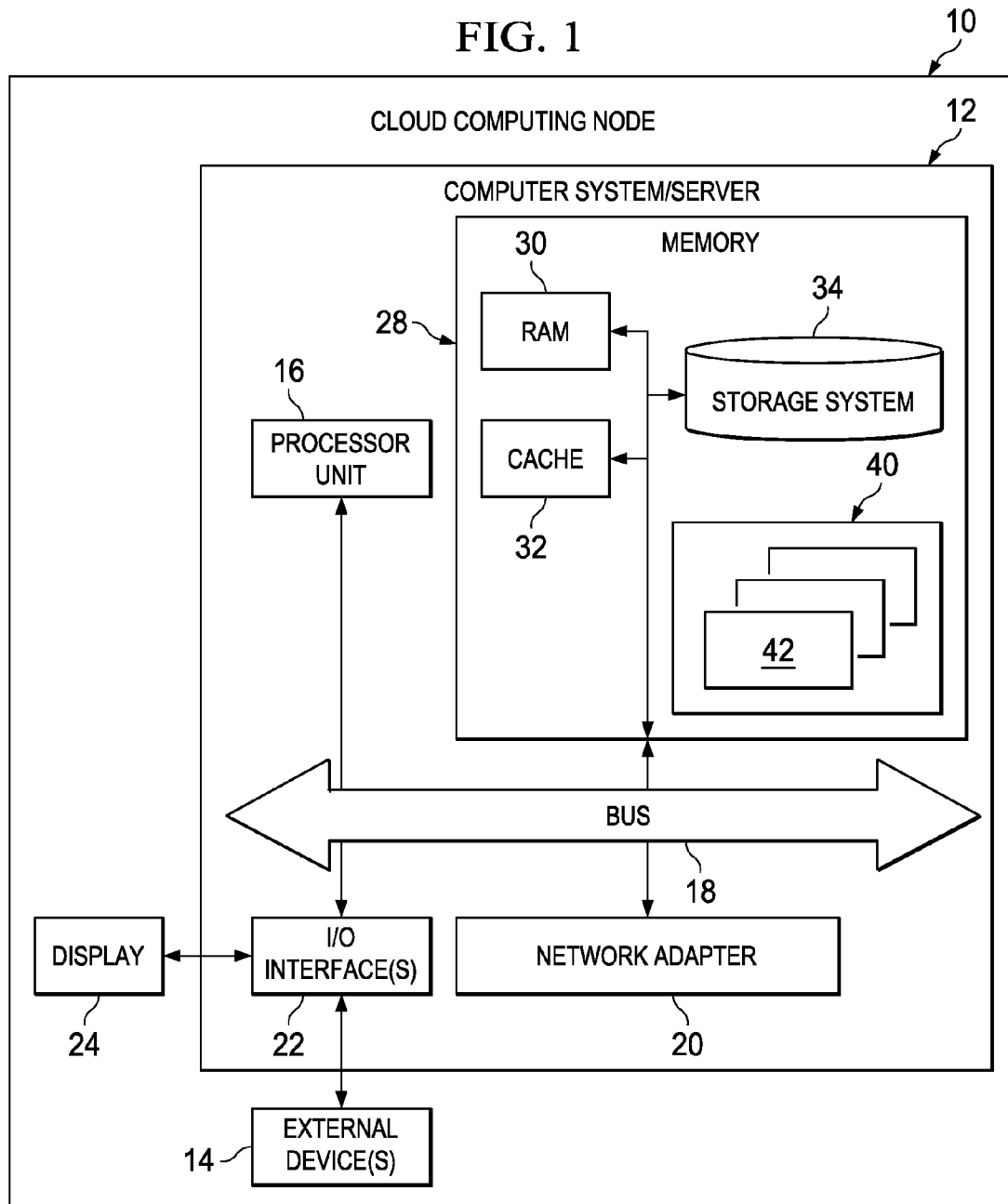
FIG. 1 is an illustration of a cloud computing node in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on remote computers, or entirely on the remote computers. In the latter scenario, the remote computers may be connected to the user's computer through any type of network, including a local area network (LAN) or a wide area network (WAN), or the connection may be made to an external computer. Further in this latter scenario, the remote computers may include hardware and software components in an application pattern management environment. For example, the components may be network appliances and other types of data processing systems that manage provisioning and deployment of applications in the application pattern management environment.

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, the illustrative embodiments are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009 which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported which provides transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, an illustration of a cloud computing node is shown in accordance with an illustrative embodiment. Cloud computing node 10 is only one example of a suitable cloud computing node and is not intended to suggest any limitation as to the scope of use or functionality of embodiments of the invention described herein.

Regardless, cloud computing node 10 is capable of being implemented and/or performing any of the functionality set forth hereinabove.

In cloud computing node 10 there is computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being run by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, memory 28, and bus 18 that couples various system components including memory 28 to processor unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
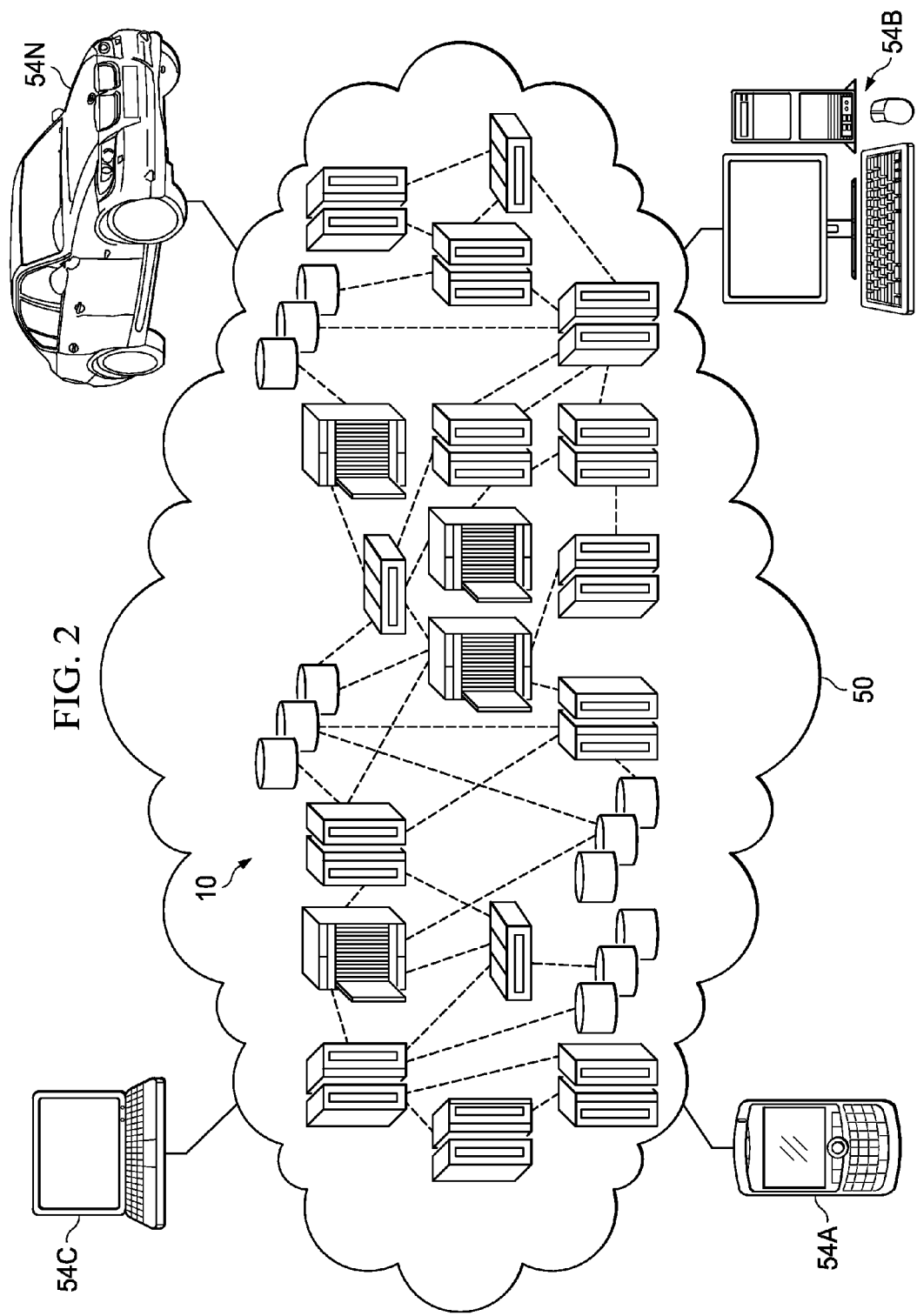
FIG. 2 is an illustration of a cloud computing environment in accordance with an illustrative embodiment.

Referring now to FIG. 2, an illustration of a cloud computing environment 50 is depicted in accordance with an illustrative embodiment. As shown, cloud computing environment 50 comprises one or more cloud computing nodes 10 with which local computing devices used by cloud consumers, such as, for example, mobile computing device or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that cloud computing nodes 10 and cloud computing environment 50 can communicate with any type of computerized device over any type of network and/or network addressable connection (e.g., using a web browser).

Figure 3:
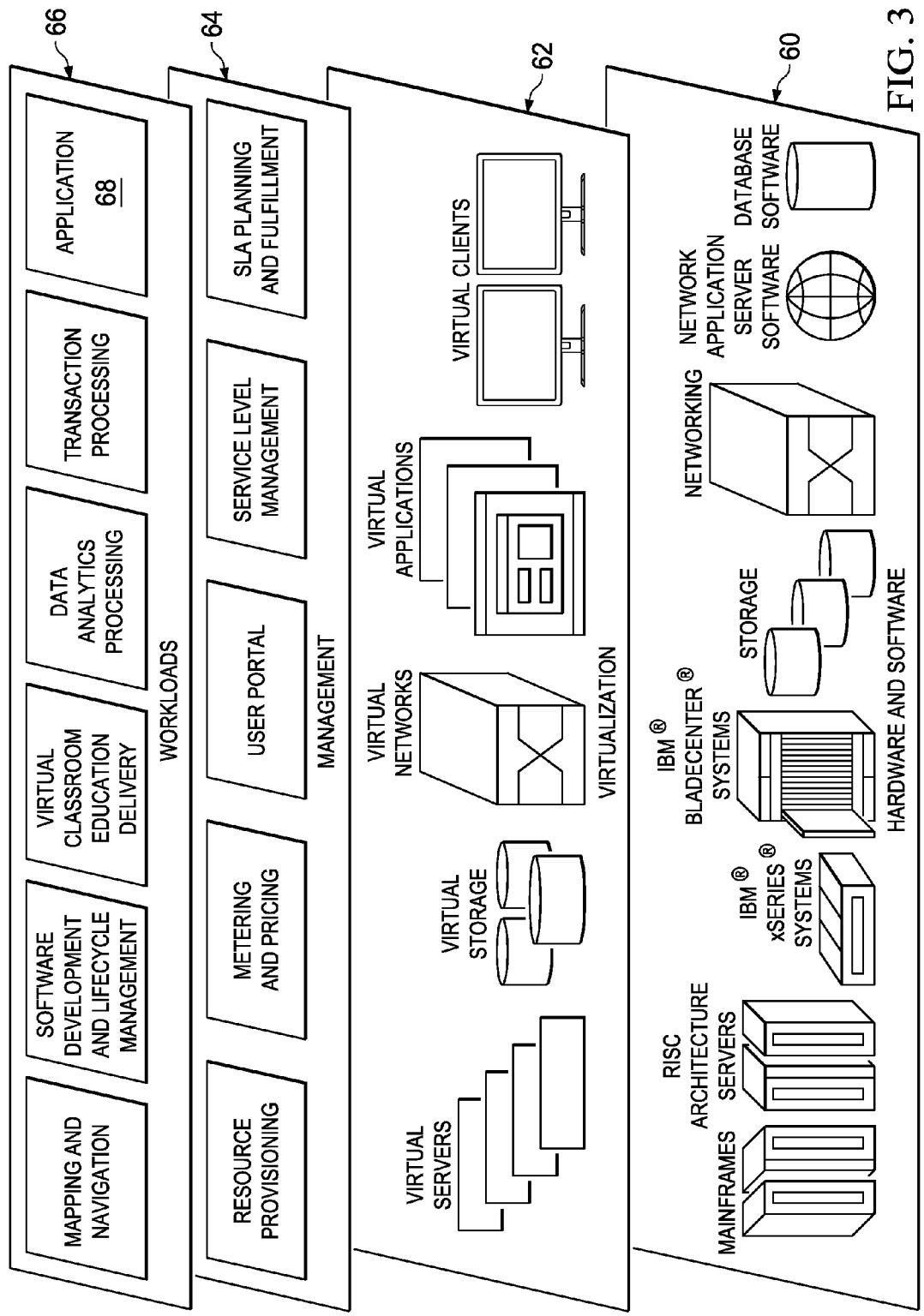
FIG. 3 is an illustration of a set of functional abstraction layers of a cloud computing environment in accordance with an illustrative embodiment.

Referring now to FIG. 3, an illustration of functional abstraction layers provided by cloud computing environment 50 (FIG. 2) is shown in accordance with an illustrative embodiment. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; and networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and application 68. In the illustrated example, application 68 is based on an application pattern. As depicted, application 68 is deployed into workloads layer 66 in the illustrated example.

The illustrative embodiments recognize and take into account a number of different considerations. For example, the illustrative embodiments recognize and take into account that existing data processing systems do not provide an ability to manage provisioning and deployment of applications based on application patterns. As an example, existing systems do not include an ability to use application patterns of applications to manage keys used by the applications to access application programming interfaces when the application is deployed on a runtime platform.

Thus, the illustrative embodiments provide a method, apparatus, and computer program product for managing application patterns. For example, a number of components of an application pattern management environment may manage provisioning and deployment of applications based on the application patterns. For example, an application pattern manager may use a provisioning system to provision service application programming interfaces required for use by an application on a runtime platform, wherein the application is based on an application pattern. The application pattern manager may also generate deployment information for deploying the application on the runtime platform. The deployment information may include values for properties of the application pattern for configuring the application on the runtime platform. The application pattern manager may further use a deployment system to process the deployment information by deploying the application on the runtime platform. In this example, responsive to the deploying of the application, the runtime platform runs the application with the application using the service application programming interfaces previously provisioned for use by the application on the runtime platform.

As another example, a number of components of an application pattern management environment may process application patterns to provision use of application programming interfaces by applications that are based on the application patterns. For example, an application pattern manager may use the application pattern of an application to manage a key that is required for use by the application to access an application programming interface when the application is deployed on a runtime platform. As used herein, a number items of is one or more items.

Figure 4:
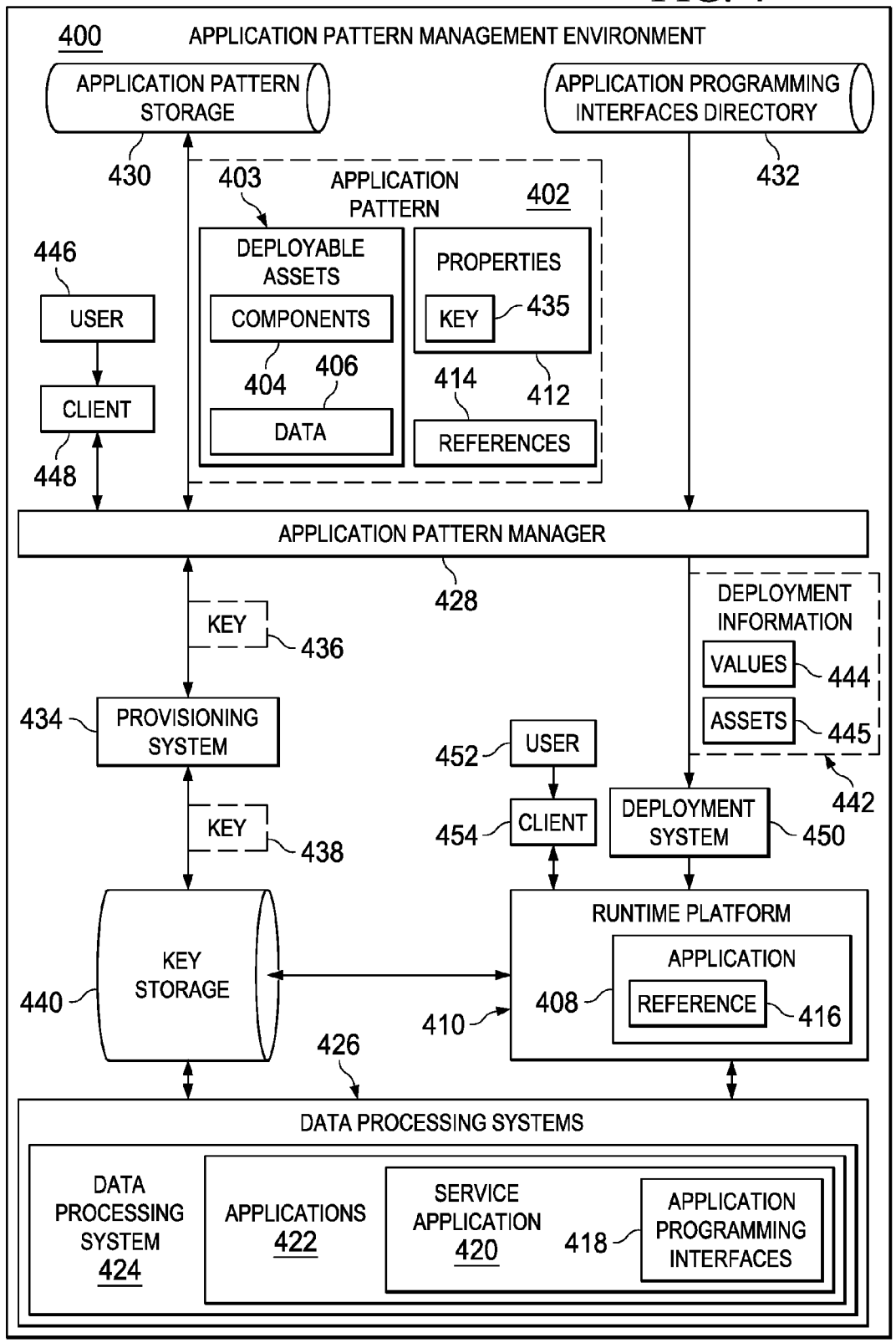
FIG. 4 is a block diagram of a data flow of a process for managing application patterns in an application pattern management environment in accordance with an illustrative embodiment.

With reference now to FIG. 4, a block diagram of a data flow of a process for managing application patterns in an application pattern management environment is depicted in accordance with an illustrative embodiment. Application pattern management environment 400 is an illustrative example of an environment for processing application pattern 402. In these illustrative examples, application patterns, such as application pattern 402, are templates of applications that comprise deployable assets 403. For example, deployable assets 403 may include at least one of components 404, data 406, and other suitable assets. As depicted, application pattern 402 may be used to generate an application, such as application 408. In these illustrative examples, application 408 is an instance of application pattern 402.

As used herein, the phrase "at least one of", when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

As depicted in this example, application 408 may run on runtime platform 410. In these illustrative examples, runtime platform 410 is a data processing system that hosts applications. For example, runtime platform 410 may be a cloud based runtime platform, such as cloud computing environment 50 or other suitable types of runtime platforms in application pattern management environment 400.

In this illustrative example, application pattern 402 includes properties 412. In the illustrative example, properties 412 are configuration options for application pattern 402. For example, properties 412 may include at least one of application programming interface dependency information for components 404, rules for processing data by components 404, rules for deploying instances of application pattern 402 on a runtime platform, public keys for provisioning application programming interfaces for use by components 404, or other suitable properties of application pattern 402. For example, dependency information for application programming interfaces may include at least one of application programming interface type information, authentication method and type information, quality of service requirements, or other suitable types of dependencies for application pattern 402.

As depicted, application pattern 402 also includes components 404. In these illustrative examples, components 404 are reusable and deployable. In these illustrative examples, components 404 may be at least one of a Java component, a web application, script language instructions, a mobile application component, another application pattern, or other suitable types of components.

In the illustrative example, data 406 in application pattern 402 is information associated with application pattern 402. For example, data 406 for application pattern 402 may include at least one of documentation for application pattern 402, domain specific information used by components 404, message files used by components 404 to present information to users, application programming interface specific data for use by components 404 when interacting with an application programming interface, or other suitable type of information for application patterns.

As depicted, references 414 in application pattern 402 are links to application programming interfaces. In this illustrative example, application 408 includes reference 416. In the illustrated example, reference 416 is an example of references 414 in application pattern 402. In this illustrative example, reference 416 points to application programming interfaces 418 provided by service application 420.

As depicted, service application 420 is an example of one application in applications 422 in data processing system 424 in a number of data processing systems 426. For example, data processing system 424 may be an example of cloud computing node 10, and other suitable types of data processing systems.

Application pattern manager 428 in application pattern management environment 400 is at least one of hardware, software, and a combination of hardware and software of a data processing system. Application pattern manager 428 may be used in a process for managing application patterns. In the illustrative example, application pattern manager 428 processes application pattern 402. As depicted, application pattern manager 428 may retrieve application pattern 402 from storage, such as application pattern storage 430. Application pattern storage 430 may be at least one of an in memory buffer, a database, or any other suitable storage for application pattern storage in application pattern management environment 400.

As depicted, application pattern manager 428 may be used to set references 414 for application programming interfaces 418 for use by application 408. In the illustrated example, application pattern manager 428 selects application programming interfaces to link to from reference 416 based on dependency information for components 404 in properties 412. In this illustrated example, responsive to selection of application programming interfaces 418 for reference 416 for use by application 408, application manager sets reference 416 to point to application programming interfaces 418. As depicted, application pattern manager 428 may select application programming interfaces 418 from storage, such as application programming interfaces directory 432. Application programming interfaces directory 432 may be at least one of an in memory buffer, a database, or any other suitable storage for application programming interfaces in application pattern management environment 400.

In these illustrative examples, application pattern manager uses provisioning system 434 to provision application programming interfaces for use by application 408. Provisioning system 434 is at least one of hardware, software, and a combination of hardware and software of a data processing system. In the illustrated example, provisioning system 434 provisions application programming interfaces 418 for use by application 408 by generating key 436 that authorizes the use. In this illustrative example, provisioning system 434 uses key 435 in properties 412 to provision application programming interfaces 418 for use by application 408. In the illustrative example, provisioning system 434 generates key 436 by at least one of making a copy of key 435, using key 435 with a third party key generation system, generating key 436 as a private key for key 435 when key 435 is a public key, and other suitable ways to generate keys in application pattern management environment 400.

In the illustrative example, key 438 is a copy of key 436 stored in key storage 440 by provisioning system 434 for later use. Key storage 440 may be at least one of an in memory buffer, a database, or any other suitable storage for keys in application pattern management environment 400. For example, key storage may be used to store one or both of key 435 and key 438 for use in authorizing use of application programming interfaces 418 by application 408.

As depicted, application pattern manager 428 generates deployment information 442. In the illustrative example, deployment information 442 is used to install and configure application 408 on runtime platform 410. In this illustrated example, deployment information 442 includes values 444 for properties 412 of application pattern 402. As depicted, values 444 for properties 412 are used by deployment system 450 to install and configure application 408 on runtime platform 410. Values used to install and configure applications on runtime platforms may be any suitable values for configurable properties of the applications. For example, values 444 may include key 436. As another example, values 444 may also include values set by a user for user configurable properties of properties 412. As depicted, user 446 on client 448 may provide user input to set values 444 of properties 412.

In the illustrated example, deployment information 442 also includes assets 445. In this illustrated example, assets 445 include one or more portions of deployable assets 403. For example, assets 445 may include a number of selected components in components 404 selected for deployment. As another example, assets 445 may also include portions of data 406 selected for deployment.

As depicted, application pattern manager 428 uses deployment system 450 to install and configure application 408 on runtime platform 410. Deployment system 450 is at least one of hardware, software, and a combination of hardware and software of a data processing system. As depicted, deployment system 450 receives deployment information 442 from application pattern manager 428. In this illustrated example, deployment system 450 communicates with runtime platform to install and configure application 408 based on deployment information 442.

In the illustrated example, runtime platform 410 runs application 408 using values 444 and assets 445. In the illustrative example, runtime platform 410 runs application 408 after receiving a request for service for application 408 from user 452 of client 454. As depicted, application 408 calls application programming interfaces 418 using reference 416. In this illustrative example, key 436 is used in an authorization process to authorize use of application programming interfaces 418 by application 408.

The illustration of application pattern management environment 400 in FIG. 4 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

In some illustrative examples, additional applications in addition to application 408 may be present within application pattern management environment 400. For example, networking applications may be run within application pattern management environment 400. In this example, the networking applications may include web servers and web browsers for providing a user interface for application 408. In this example, client 454 may interact with the user interface for application 408 through a web browser that is communicating with a web server. Further in this example, the same or other web servers and web browsers provide a user interface for application pattern manager 428. For example, client 448 may interact with the user interface for application pattern manager 428 through another web browser that is communicating with another web server.

Also, although components of application pattern management environment 400 are shown as separate blocks in application pattern management environment 400, all or a portion of these may also be implemented in data processing systems 426 or other suitable components in application pattern management environment 400. In these illustrative examples, application pattern management environment 400 may be implemented by any combination of hardware and software products, and may also be implemented in one or more computer systems or a cluster of computer systems.

Figure 5:
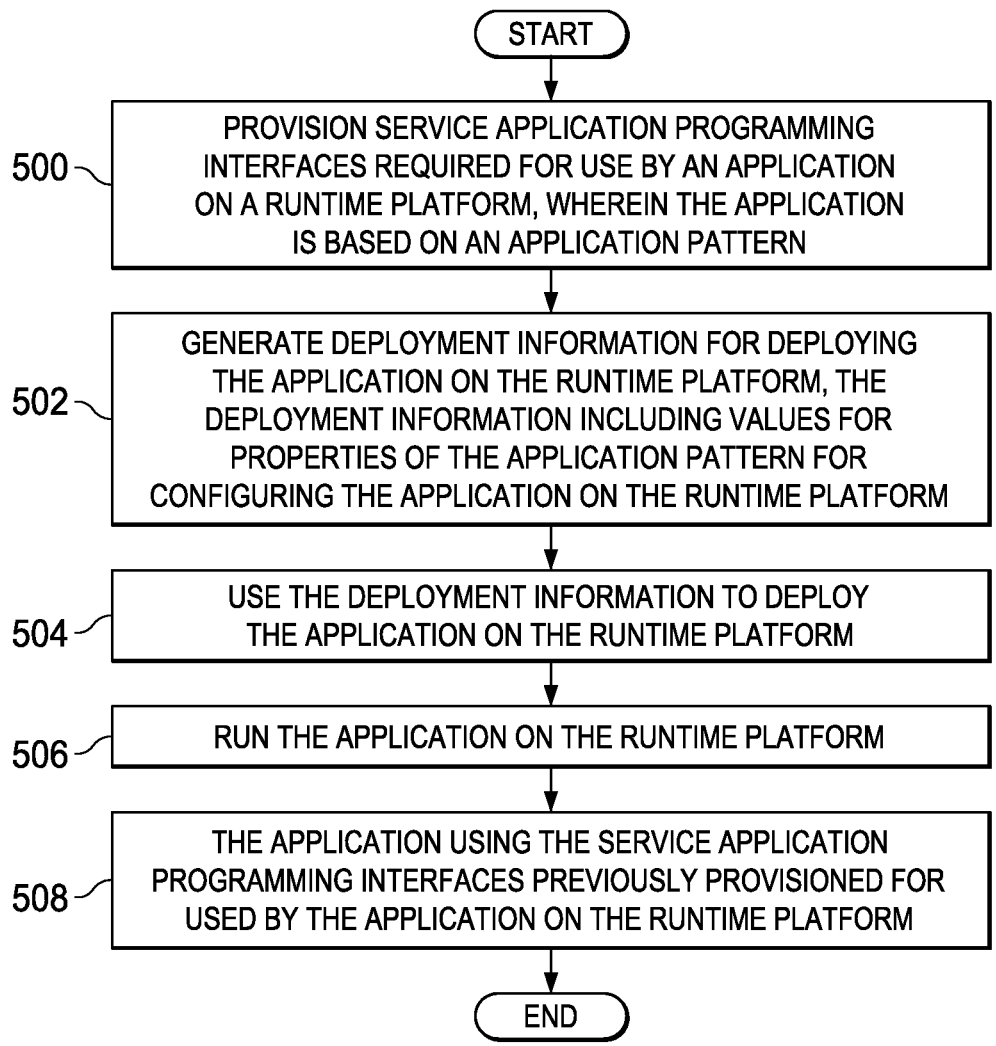
FIG. 5 is a flowchart of a process for managing application patterns in accordance with an illustrative embodiment.

With reference next to FIG. 5, an illustration of a flowchart of a process for managing application patterns is depicted in accordance with an illustrative embodiment. The steps illustrated in FIG. 5 are examples of steps that may be used to process application pattern 402 in FIG. 4. These steps may be implemented in data processing systems 426 in FIG. 4, runtime platform 410 in FIG. 4, and in other data processing systems in FIG. 4. For example, the different steps may be performed by application pattern manager 428 in FIG. 4, provisioning system 434 in FIG. 4, and deployment system 450 in FIG. 4.

The process begins by provisioning service application programming interfaces required for use by an application on a runtime platform, wherein the application is based on an application pattern (step 500). The application pattern in step 500 is an example of application pattern 402 in FIG. 4. The application is an example of application 408 in FIG. 4. The runtime platform is an example of runtime platform 410 in FIG. 4.

The process also generates deployment information for deploying the application on the runtime platform, wherein the deployment information includes values for properties of the application pattern for configuring the application on the runtime platform (step 502). The deployment information in step 502 is an example of deployment information 442 in FIG. 4.

As depicted, the process may use the deployment information to deploy the application on the runtime platform (step 504). The deployment information in step 504 is an example of deployment information 442 in FIG. 4.

As depicted, the steps of the process also include running the application on the runtime platform (step 506). As also depicted, the steps of the process then include the application using the service application programming interfaces previously provisioned for used by the application on the runtime platform (step 508), with the process terminating thereafter. The processing performed in steps 506 and 508 may be performed by data processing systems 426, runtime platform 410, and other data processing systems in application pattern management environment 400.

The process in FIG. 5 may be repeated any number of times to process additional applications based on application patterns. Additionally, the process may be repeated responsive to determination of a change to one or more of the application pattern and values 444. For example, the steps may be repeated responsive to the application manager determining that a change occurred to at least one of a value in values 444 submitted via user input, an expiration of a key in values 444, an expiration of an asset in assets 445 or other suitable type of changes.

Figure 6:
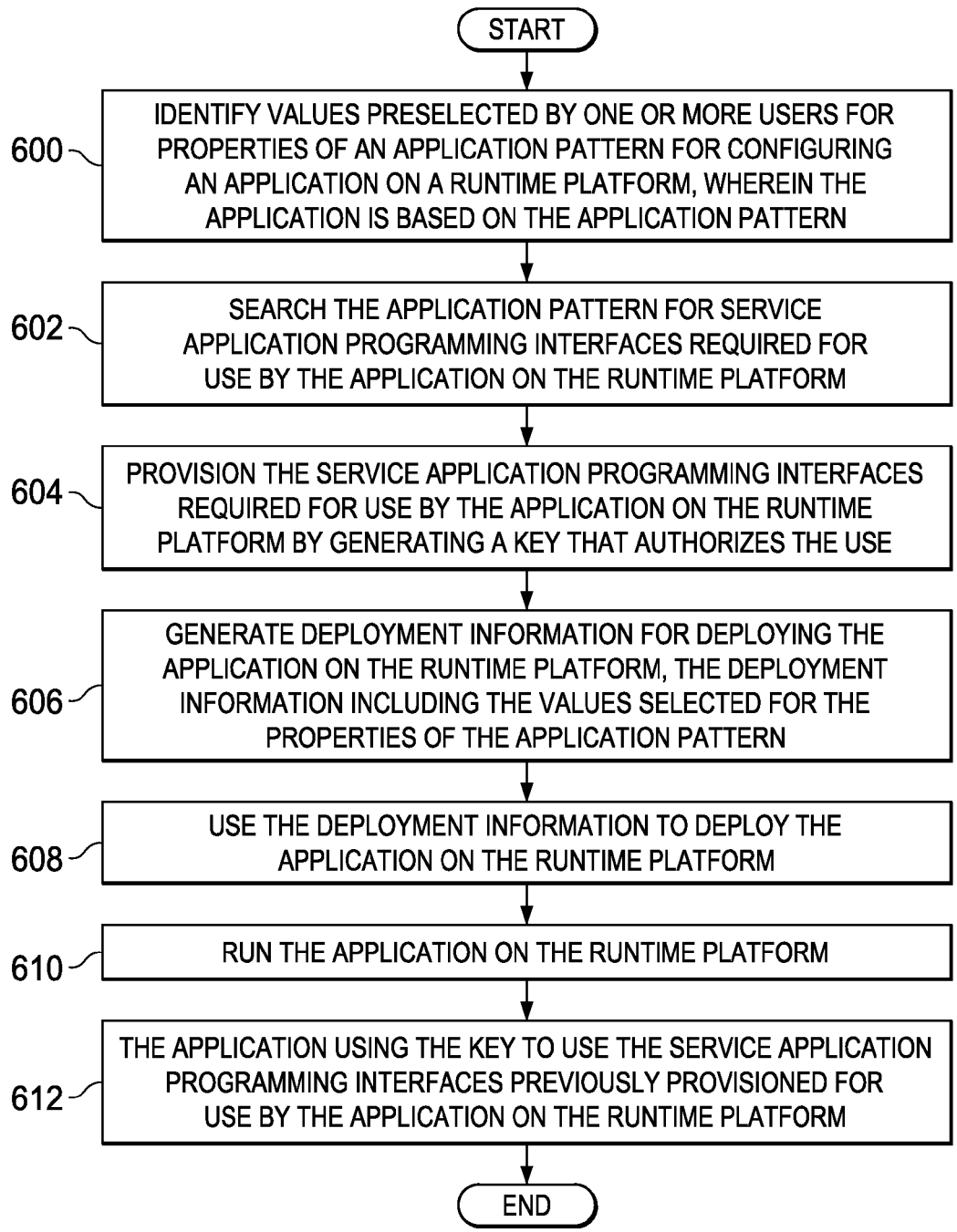
FIG. 6 is a flowchart of a process for provisioning use of application programming interfaces for an application based on an application pattern in accordance with an illustrative embodiment.

With reference to FIG. 6, an illustration of a flowchart of a process for provisioning use of application programming interfaces for an application based on an application pattern is depicted in accordance with an illustrative embodiment. The steps illustrated in FIG. 6 are examples of steps that may be used to process application pattern 402 in FIG. 4. These steps may be implemented in data processing systems 426 in FIG. 4, runtime platform 410 in FIG. 4, and in other data processing systems in FIG. 4. For example, the different steps may be performed by application pattern manager 428 in FIG. 4, provisioning system 434 in FIG. 4, and deployment system 450 in FIG. 4.

The process begins by identifying values preselected by one or more users for properties of an application pattern for configuring an application on a runtime platform, wherein the application is based on the application pattern (step 600). The application pattern in step 600 is an example of application pattern 402 in FIG. 4. The application is an example of application 408 in FIG. 4. The runtime platform is an example of runtime platform 410 in FIG. 4. The values for the properties in step 600 are an example of values 444 in FIG. 4 for properties 412 in FIG. 4.

The process also searches the application pattern for service application programming interfaces required for use by the application on the runtime platform (step 602). The service application programming interfaces in step 602 is an example of application programming interfaces 418 in FIG. 4.

As depicted, the process may include a step for provisioning the service application programming interfaces required for use by the application on the runtime platform by generating a key that authorizes the use (step 604). The key in step 604 is an example of key 436 in FIG. 4.

The process generates deployment information for deploying the application on the runtime platform, the deployment information including the values selected for the properties of the application pattern (step 606). The deployment information in step 606 is an example of deployment information 442 in FIG. 4. The process uses the deployment information to deploy the application on the runtime platform (step 608).

As depicted, the steps of the process also include running the application on the runtime platform (step 610). The steps of the process then include the application using the key to use the service application programming interfaces previously provisioned for use by the application on the runtime platform (step 612), with the process terminating thereafter. The processing performed in steps 610 and 612 may be performed by data processing systems 426, runtime platform 410, and other data processing systems in application pattern management environment 400.

The process in FIG. 6 may be repeated any number of times to process additional applications based on application patterns. Additionally, other steps may be included and some steps may be removed in this process for provisioning use of application programming interfaces for the application based on the application pattern. For example, the search in step 602 for service application programming interfaces required for use by the application may include receiving user input. In this example, the user input may include at least one of selecting, providing, validating, or authorizing which application programming interfaces will be used by the application on the runtime platform.

Figure 7:
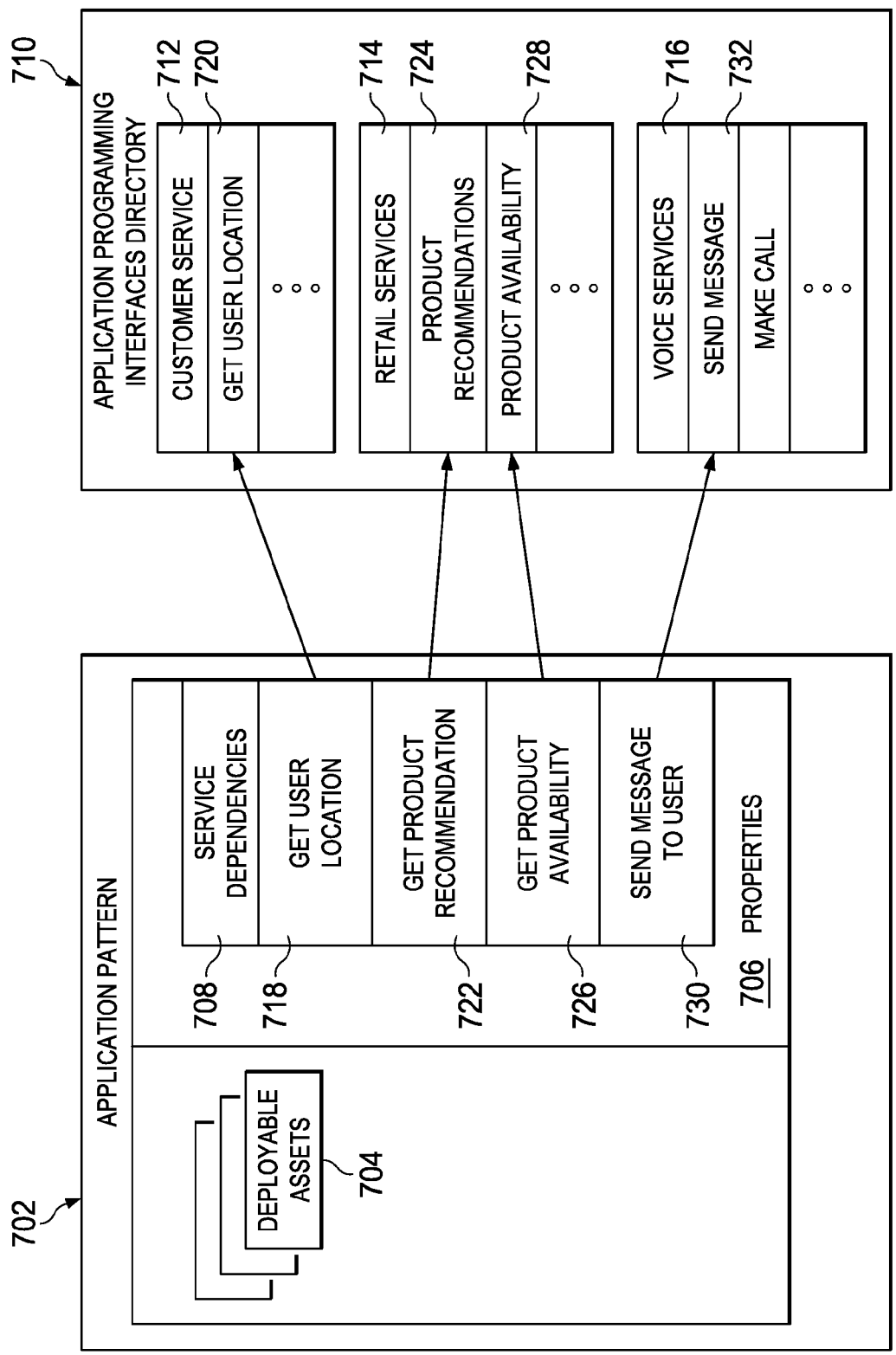
FIG. 7 is a block diagram of application programming interfaces for an application pattern in accordance with an illustrative embodiment.

Turning next to FIG. 7, a block diagram of application programming interfaces for an application pattern is depicted in accordance with an illustrative embodiment. In these illustrative examples, application pattern 702 in FIG. 7 is an example of application pattern 402 in FIG. 4. As depicted, application pattern 702 is an example of a location based application pattern. Deployable assets 704 in application pattern 702 is an example of deployable assets 403 in application pattern 402 in FIG. 4. Service dependencies 708 in properties 706 is an example of dependency information for components 404 in properties 412 in FIG. 4. Application programming interfaces directory 710 is an example of applications programming interfaces directory 432 in FIG. 4. Customer service 712, retail services 714, and voice services 716 are examples of application programming interfaces 418 in FIG. 4.

In this illustrative example, responsive to a process for selecting application programming interfaces for service dependencies get user location 718, get product recommendation 722, get product availability 726, and send message to user in service dependencies 708 are set, respectively, to point to get user location 720, product recommendations 724, product availability 728, and send message 732 in application programming interfaces directory 710.

With reference now to FIG. 8, an example of deployment information for an application is depicted in accordance with an illustrative embodiment. In these illustrative examples, deployment information 800 in FIG. 8 is an example of one implementation of deployment information 442 in FIG. 4.

As depicted, deployment information 800 is generated in a process for deploying an application on a runtime platform. In this illustrative example, deployment information 800 includes values selected for properties of an application pattern.

Figure 9:
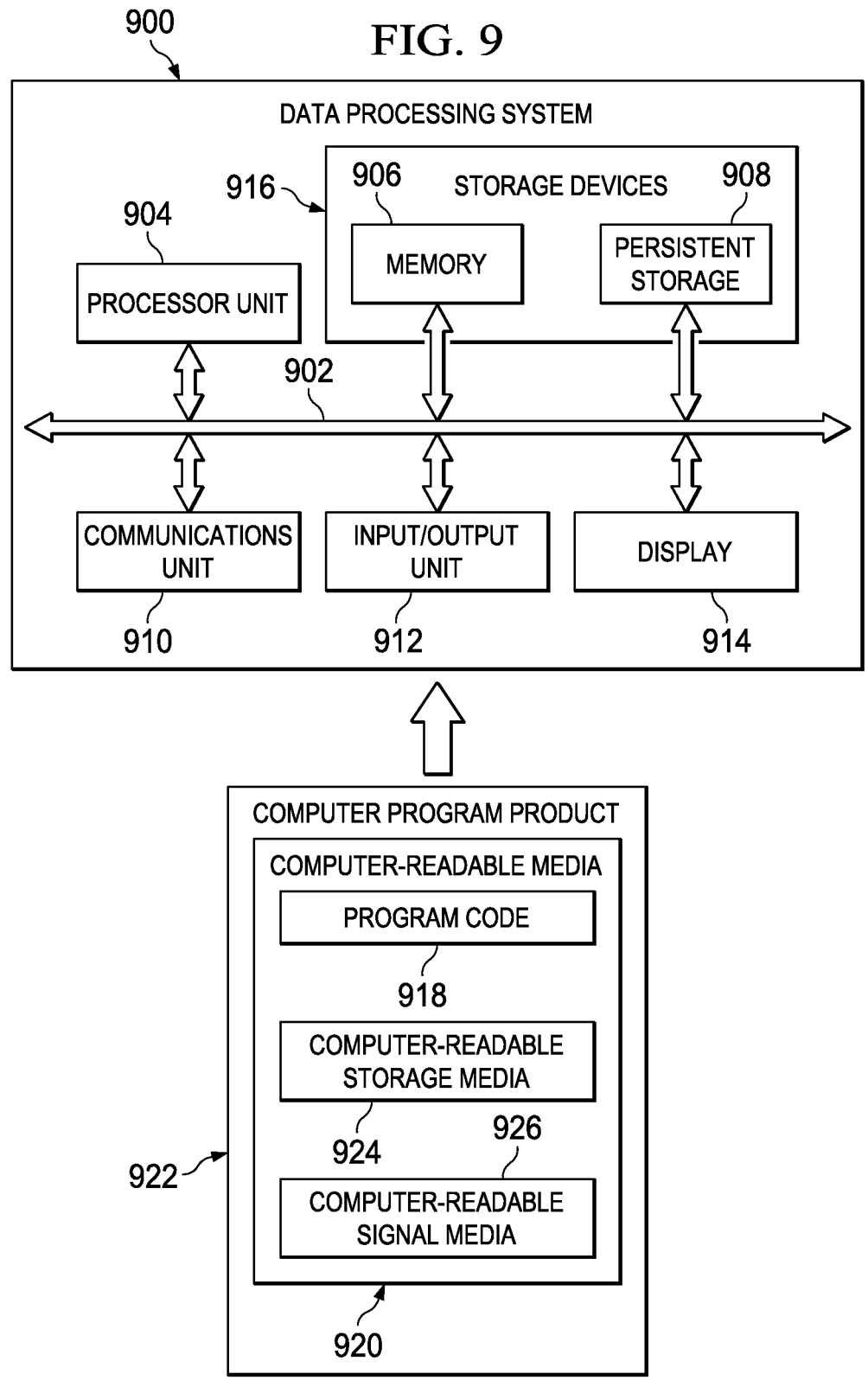
FIG. 9 is an illustration of a data processing system in accordance with an illustrative embodiment.

Turning now to FIG. 9, an illustration of a data processing system is depicted in accordance with an illustrative embodiment. Data processing system 900 is an example of a data processing system that may be used to implement managing application patterns in an application pattern management environment. Data processing system 900 is also an example of a data processing system that may be used to implement computer system/server 12 and cloud computing nodes such as cloud computing node 10 in FIG. 1. Data processing system 900 also may be used to implement mobile computing device or cellular telephone MA, desktop computer MB, laptop computer MC, automobile computer system MN, and other local computing devices used by cloud consumers in FIG. 2. Data processing system 900 may also be used to implement the hardware and software components of hardware and software layer 60 in FIG. 3. More particularly, data processing system 900 may be used to implement client 448, client 454, data processing systems 426, runtime platform 410, application pattern manager 428, provisioning system 434, deployment system 450, application pattern storage 430, application programming interfaces directory 432, and key storage 440 in FIG. 4

In this illustrative example, data processing system 900 includes communications framework 902, which provides communications between processor unit 904, memory 906, persistent storage 908, communications unit 910, input/output (I/O) unit 912, and display 914. In these examples, communications frame work 902 may be a bus system.

Processor unit 904 serves to execute instructions for software that may be loaded into memory 906. Processor unit 904 may be a number of processors, a multiprocessor core, or some other type of processor, depending on the particular implementation. A number, as used herein with reference to an item, means one or more items. Further, processor unit 904 may be implemented using a number of heterogeneous processor systems in which a main processor is present with secondary processors on a single chip. As another illustrative example, processor unit 904 may be a symmetric multiprocessor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications framework 902. In these illustrative examples, the instructions are in a functional form on persistent storage 908. These instructions may be loaded into memory 906 for execution by processor unit 904. The processes of the different embodiments may be performed by processor unit 904 using computer implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926. Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900. In these examples, computer readable storage media 924 is a physical or tangible storage device used to store program code 918 rather than a medium that propagates or transmits program code 918. Computer readable storage media 924 is also referred to as a computer readable tangible storage device or a computer readable physical storage device. In other words, computer readable storage media 924 is a media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations. For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 918 may be omitted because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications framework 902 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 906, or a cache, such as found in an interface and memory controller hub that may be present in communications framework 902.

Thus, the illustrative embodiments provide a method, apparatus, and computer program product for managing application patterns. In some examples, a program provisions service application programming interfaces required for use by an application on a runtime platform, wherein the application is based on an application pattern. In these examples, the program also generates deployment information for deploying the application on the runtime platform. The deployment information, in these examples, includes values for properties of the application pattern for configuring the application on the runtime platform. Then the program uses the deployment information to deploy the application on the runtime platform. In response, the runtime platform runs the application with the application using the service application programming interfaces previously provisioned for use by the application on the runtime platform. For example, the program may use an application pattern of an application to manage a key required for use by the application to access an application programming interface when the application is deployed on a runtime platform. In this example, the managing of the key may include the program determining that the key is required based on the application pattern. In some examples the program generates the key for use by the application responsive to the determination that the key is required.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for managing application patterns, the computer-implemented method comprising:

identifying, by one or more processor units, values preselected by one or more users for properties of an application pattern for configuring an application on a runtime platform, wherein the application is based on the application pattern, and wherein the application pattern comprises information including templates of the application comprising deployable assets including components, and wherein the properties further include configuration options comprising public keys for provisioning application programming interfaces for use by the components;

searching, by the one or more processor units, the application pattern for service application programming interfaces required for use by the application, wherein the service application programming interfaces required for use by the application are identified, and wherein the service application programming interfaces, as identified, are selected to link to, from references, based on dependency information for the components in the properties;

provisioning, by the one or more processor units, service application programming interfaces identified as required for use by the application on the runtime platform, wherein the provisioning includes a key authorizing use of the service application programming interfaces;

generating, by the one or more processor units, deployment information for deploying the application on the runtime platform, the deployment information including the values for the properties of the application pattern for installing and configuring the application on the runtime platform and including a number of selected components for deployment; and deploying the application on the runtime platform, by the one or more processor units using the deployment information to install and configure the application on the runtime platform, and in response the runtime platform running the application with the application calling the service application programming interfaces using the references using the key, authorizing use of the service application programming interfaces previously provisioned for use by the application on the runtime platform.

2. The computer-implemented method of claim 1, wherein the values for the properties preselected by the one or more users are configuration options for the application pattern.

3. The computer-implemented method of claim 1, wherein the provisioning, by the one or more processor units, the service application programming interfaces required for the use by the application on the runtime platform comprises:

searching, by the one or more processor units, the application pattern for the service application programming interfaces required for use by the application; and responsive to a search result, setting by an application pattern manager, the references to point to the application programming interfaces required for use by the application, wherein the application pattern manager selects the application programming interfaces from a storage that includes an application programming interfaces directory, and wherein the storage includes an in-memory buffer and a database.

4. The computer-implemented method of claim 1, wherein the application pattern comprises a group of components selected from at least one of Java components, script language components, and client application components for a client that communicates with the application, and data for use by the application, and wherein the application using the service application programming interfaces comprises the group of components using the service application programming interfaces.

5. The computer-implemented method of claim 1, wherein the provisioning, by the one or more processor units, the service application programming interfaces required for the use by the application on the runtime platform comprises:

generating one or more keys that authorize the use; and wherein the application using the service application programming interfaces previously provisioned for use by the application on the runtime platform includes using the one or more keys.

6. The computer-implemented method of claim 1, further comprising:

storing, by the one or more processors, the service application programming interfaces in a directory and the application pattern in a database, wherein the directory and the database each use application programming interfaces that are restful interfaces.

7. The computer-implemented method of claim 1, wherein the provisioning, by the one or more processor units, the service application programming interfaces required for the use by the application on the runtime platform comprises using a provisioning application programming interface that is a restful interface.

8. The computer-implemented method of claim 1, wherein the service application programming interfaces are provided by a first server computer and the runtime platform is provided by a second server computer.

9. The computer-implemented method of claim 1, wherein the service application programming interfaces are restful interfaces, and wherein the runtime platform is a selected one of cloud based runtime platforms and software as a service based runtime platforms.

10. A system for managing application patterns, the system comprising:

one or more processor units, a memory, and one or more computer readable storage devices having program instructions stored in at least one of the computer readable storage devices for execution by at least one of the processor units via the memory to:

identify values preselected by one or more users for properties of an application pattern for configuring an application on a runtime platform, wherein the application is based on the application pattern, and wherein the application pattern comprises information including templates of the application comprising deployable assets including components, and wherein the properties further include configuration options comprising public keys for provisioning application programming interfaces for use by the components;

search the application pattern for service application programming interfaces required for use by the application, wherein the service application programming interfaces required for use by the application are identified, and wherein the service application programming interfaces, as identified, are selected to link to, from references, based on dependency information for the components in the properties;

provision service application programming interfaces identified as required for use by the application on the runtime platform, wherein provisioning includes a key authorizing use of the service application programming interfaces;

generate deployment information for deploying the application on the runtime platform, the deployment information including the values for the properties of the application pattern for installing and configuring the application on the runtime platform and including a number of selected components for deployment; and deploy the application on the runtime platform, using the deployment information to install and configure the application on the runtime platform, and in response the runtime platform running the application with the application calling the service application programming interfaces using the references using the key authorizing use of the service application programming interfaces previously provisioned for use by the application pattern on the runtime platform.

11. The system of claim 10, wherein the values for the properties preselected by the one or more users are configuration options for the application pattern.

12. The system of claim 10, wherein the program instructions in the at least one of the computer readable storage devices for execution by the at least one of the processor units via the memory to provision the service application programming interfaces required for the use by the application on the runtime platform further comprise:
program instructions to search the application pattern for the service application programming interfaces required for use by the application; and
program instructions responsive to a search result, to set the references to point to the application programming interfaces required for use by the application, wherein an application pattern manager selects the application programming interfaces from a storage that includes an application programming interfaces directory, and wherein the storage includes an in-memory buffer, and a database.

13. The system of claim 10, wherein the application pattern comprises a group of components selected from at least one of Java components, script language components, and client application components for a client that communicate with the application, and data for use by the application, and wherein the application using the service application programming interfaces comprises the group of components using the service application programming interfaces.

14. The system of claim 10, wherein the program instructions in the at least one of the computer readable storage devices for execution by the at least one of the processor units via the memory to provision the service application programming interfaces required for the use by the application on the runtime platform further comprise:
program instructions to generate one or more keys that authorize the use, and wherein the application using the service application programming interfaces previously provisioned for use by the application on the runtime platform includes using the one or more keys.

15. A computer program product for managing application patterns, the computer program product comprising:
a computer readable storage medium;
program instructions, stored on the computer readable storage medium, for identifying values preselected by one or more users for properties of an application pattern for configuring an application on a runtime platform, wherein the application is based on the application pattern, and wherein the application pattern comprises information including templates of the application comprising deployable assets including components, and wherein the properties further include configuration options comprising public keys for provisioning application programming interfaces for use by the components;
program instructions, stored on the computer readable storage medium, for searching the application pattern for service application programming interfaces required for use by the application, wherein the service application programming interfaces required for use by the application are identified, and wherein the service application programming interfaces, as identified, are selected to link to, from references, based on dependency information for the components in the properties;
program instructions, stored on the computer readable storage medium, for provisioning service application programming interfaces identified as required for use by the application on the runtime platform, wherein the provisioning includes a key authorizing use of the service application programming interfaces;
program instructions, stored on the computer readable storage medium, for generating deployment information for deploying the application on the runtime platform, the deployment information including the values for the properties of the application pattern for installing and configuring the application pattern on the runtime platform and including a number of selected components for deployment; and
program instructions, stored on the computer readable storage medium, for deploying the application on the runtime platform, using the deployment information to install and configure the application on the runtime platform, and in response the runtime platform running the application with the application calling the service application programming interfaces using the references using the key authorizing use of the service application programming interfaces previously provisioned for use by the application on the runtime platform.

16. The computer program product of claim 15, wherein the values for the properties preselected by one or more users are configuration options for the application pattern.

17. The computer program product of claim 15, wherein the program instructions, stored on the computer readable storage medium, for provisioning the service application programming interfaces required for the use by the application on the runtime platform further comprise:
program instructions for searching the application pattern for the service application programming interfaces required for use by the application; and
program instructions responsive to a search result, to set the references to point to the application programming interfaces required for use by the application, wherein an application pattern manager selects the application programming interfaces from a storage, that includes an application programming interfaces directory, and wherein the storage includes an in-memory buffer, and a database.

18. The computer program product of claim 15, wherein the application pattern comprises a group of components selected from at least one of Java components, script language components, and client application components for a client that communicates with the application, and data for use by the application, and wherein the application using the service application programming interfaces comprises the group of components using the service application programming interfaces.

19. The computer program product of claim 15, wherein the program instructions, stored on the computer readable storage medium, for provisioning the service application programming interfaces required for the use by the application on the runtime platform further comprise:
program instructions for generating one or more keys that authorize the use; and
wherein the application using the service application programming interfaces previously provisioned for use by the application on the runtime platform includes using the one or more keys.

20. A method for provisioning a service application programming
interface required for use by an application on a runtime platform, the method comprising:
identifying, by one or more processor units, a public key of an application pattern, wherein the application pattern comprises information including templates of the application comprising deployable assets including components, and properties further including configuration options comprising public keys for provisioning application programming interfaces for use by the components, and wherein the service application programming interface required for use by the application is a result of a search;

using the public key to generate, by the one or more processor units, a private key for accessing the service application programming interface, wherein the application is based on the application pattern, and wherein the service application programming interface required for use by the application on the runtime platform to link to, from a reference, is based on dependency information for components in properties of the application pattern for configuring the application on the runtime platform;

configuring, by one or more processor units, the application on the runtime platform to use the private key generated to access the service application programming interface, wherein in response the runtime platform running the application with the application calling the service application programming interfaces using the references using the private key;

responsive to a use of the private key generated by the application in accessing the service application programming interface, the one or more processor units, determining whether the application authorized to access the service application programming interface; and authorizing use of the service application programming interfaces previously provisioned for use by the application on the runtime platform based on a comparison of the private key generated with the public key identified.

* * * * *